US008479303B2

(12) United States Patent
Kumar H S (10) Patent No.: US 8,479,303 B2
(45) Date of Patent: Jul. 2, 2013

(54) METHOD AND SYSTEM FOR SCORING EMPLOYMENT CHARACTERISTICS OF A PERSON

(75) Inventor: Anil Kumar H S, Bangalore (IN)

(73) Assignee: SAP AG, Walldorf (DE)

( * ) Notice: Subject to any disclaimer, the term of this patent is extended or adjusted under 35 U.S.C. 154(b) by 1581 days.

(21) Appl. No.: 11/540,026

(22) Filed: Sep. 28, 2006

(65) Prior Publication Data

US 2008/0083023 A1 Apr. 3, 2008

(51) Int. Cl.
*H04L 29/06* (2006.01)
(52) U.S. Cl.
USPC ............ 726/29; 705/320; 705/321; 705/328
(58) Field of Classification Search
USPC ........................................................... 726/29
See application file for complete search history.

(56) References Cited

U.S. PATENT DOCUMENTS

| | | | | | |
|---|---|---|---|---|---|
| 5,892,510 | A | * | 4/1999 | Lau et al. | 715/866 |
| 6,070,141 | A | * | 5/2000 | Houvener et al. | 705/76 |
| 6,119,097 | A | * | 9/2000 | Ibarra | 705/11 |
| 6,199,193 | B1 | * | 3/2001 | Oyagi et al. | 717/101 |
| 6,275,812 | B1 | * | 8/2001 | Haq et al. | 705/7.14 |
| 6,457,005 | B1 | | 9/2002 | Torrey | |
| 6,618,734 | B1 | * | 9/2003 | Williams et al. | 1/1 |
| 2001/0034011 | A1 | * | 10/2001 | Bouchard | 434/236 |
| 2003/0009479 | A1 | | 1/2003 | Phair | |
| 2003/0046237 | A1 | * | 3/2003 | Uberti | 705/44 |
| 2003/0050816 | A1 | * | 3/2003 | Givens et al. | 705/7 |
| 2003/0154318 | A1 | * | 8/2003 | Attwood | 709/310 |
| 2003/0171927 | A1 | * | 9/2003 | Bernard | 704/273 |
| 2004/0012588 | A1 | * | 1/2004 | Lulis | 345/440 |
| 2004/0044538 | A1 | * | 3/2004 | Mauzy et al. | 705/1 |
| 2004/0066401 | A1 | * | 4/2004 | Bushey et al. | 345/744 |
| 2004/0138903 | A1 | | 7/2004 | Zuniga | |
| 2004/0153355 | A1 | * | 8/2004 | Deering et al. | 705/9 |
| 2004/0186852 | A1 | * | 9/2004 | Rosen | 707/104.1 |
| 2005/0033633 | A1 | * | 2/2005 | LaPasta et al. | 705/11 |
| 2005/0080656 | A1 | * | 4/2005 | Crow et al. | 705/8 |
| 2006/0288090 | A1 | * | 12/2006 | Kraft | 709/219 |

OTHER PUBLICATIONS

Supjarerndee et al., Recruitment filtering with personality-job fit model, Apr. 2002, Proceedings of the International Conference on Information Technology: Coding and Computing (ITCC 2002), pp. 46-51.*

(Continued)

*Primary Examiner* — Taghi Arani
*Assistant Examiner* — Kenneth Chang
(74) *Attorney, Agent, or Firm* — Kenyon & Kenyon LLP (57) ABSTRACT

A first method and system includes receiving initial information related to a person; verifying the accuracy of the initial information; assigning a plurality of scores to the person, the plurality of scores having a plurality of score types, each of the plurality of scores having a score value and a score type; and setting the score value of at least one of the plurality of scores based on the verified initial information. A second method and system includes, for each person of a plurality of persons, assigning a plurality of scores, each of the plurality of scores having a score type and a score value, the score value of at least one of the plurality of scores being based on verified information; receiving a request for information related to a specific score type and a specific score value; and determining a portion of the plurality of persons which have scores related to the specific score type and specific score value.

18 Claims, 4 Drawing Sheets

OTHER PUBLICATIONS

Breaugh, James, The use of biodata for employee selection: Past research and future directions, Sep. 2009, Human Resource Management Review, vol. 19, Issue 3, pp. 219-231.*

Wu et al., An employee performance estimation model for the logistics industry, Mar. 2010, Decision Support Systems, vol. 48, Issue 4, pp. 568-581.*

* cited by examiner

METHOD AND SYSTEM FOR SCORING EMPLOYMENT CHARACTERISTICS OF A PERSON

BACKGROUND INFORMATION

Generally speaking, organizations may need to verify the credentials of people with whom they wish to associate. For example, a specific organization may need to verify the credentials of a specific person applying for employment with the specific organization. One typical way in which organizations verify the credentials of people is for each organization to hire a third-party entity to verify the credentials each time credentials need to be verified. However, there are undesirable aspects of this way of verifying credentials. For example, this way of verifying credentials may be inefficient, as the third party entity may have no knowledge of other credential verifications involving the specific person, for example possibly performed by other third-party entities. Thus, the credentials of the specific person may be duplicatively verified many times over the specific person's career, by various different third-party entities, and at various different times. Furthermore, this way of verifying credentials may be error-prone or unable to make inferences about the person based on the credentials.

BRIEF DESCRIPTION OF THE DRAWINGS

So that features of the present invention can be understood in detail, a description of the invention can be had by reference to embodiments, some of which are illustrated in the appended drawings. It is to be noted, however, that the appended drawings illustrate only typical embodiments of the invention and are therefore not to be considered limiting of its scope, for the invention may admit to other equally effective embodiments.

DETAILED DESCRIPTION

Embodiments of the present invention are related to scoring employability and employment performance characteristics of a person based on verified information related to the person. For example, embodiments of the present invention are related to scoring competency, reliability, skill sets, qualities, performance level, strengths, weaknesses, and other qualities of the person as they relate to an employment environment.

Figure 1:
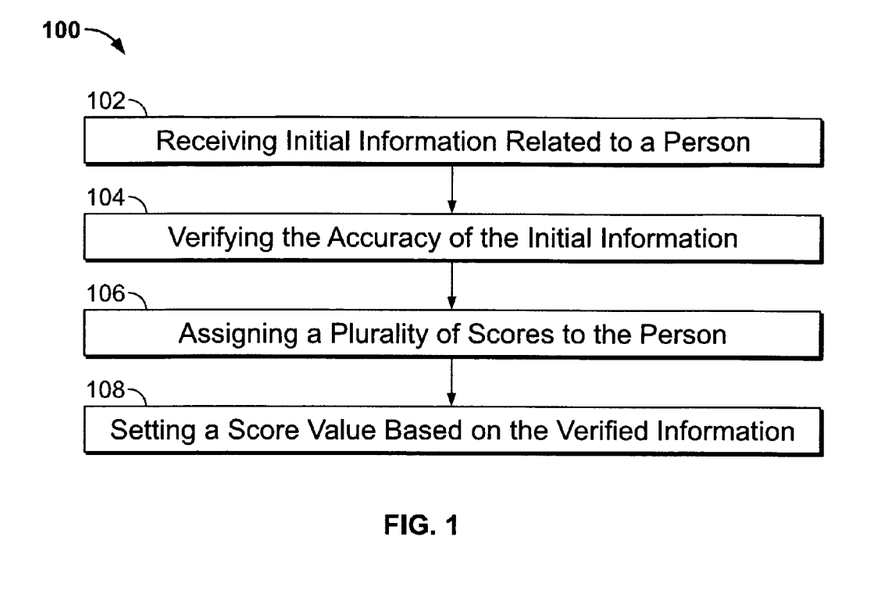
FIG. 1 is a flow chart depicting a schematic representation of one embodiment of a first method.

FIG. 1 is a flow chart depicting a schematic representation of one embodiment of a method 100. The schematic nature of FIG. 1 is not intended to provide exhaustive detail concerning the method 100, however, and instead the specific steps of the method 100 are described in greater detail in the Specification and Claims of the present Application. Furthermore, additions to and variations of the embodiment of the method 100 depicted in FIG. 1 are possible as described in the Specification and Claims of the present Application.

According to FIG. 1, the method 100 beings at step 102. At step 102, initial information related to the person to be scored is received. The initial information is related to the employability and employment performance characteristics of the person, and includes information such as, for example, experiences of the person and other qualifications of the person which are relevant to employment. The initial information optionally includes information related to a plurality of experiences and qualifications of the person. In one embodiment, the initial information comprises information related to at least one of: an employment experience of the person, an academic experience of the person, or a professional registration of the person. In one embodiment, the initial information comprises information related to a plurality of employment experiences of the person.

The information related to the employment experience optionally includes at least one of: an identity of an employer associated with the employment experience, the length of the employment experience, a start date of the employment experience, an end date of the employment experience, a job title associated with the employment experience, or responsibilities associated with the employment experience. The information related to the academic experience optionally includes at least one of: an identity of an academic institution associated with the academic experience, a type of degree received as a result of the academic experience, a major course of study of the academic experience, a date by which the degree was received, a grade point average associated with the academic experience, or honors received in association with the academic experience. Examples of the professional registration include a bar registration, a professional engineering registration, a government agency registration, a machinery operation qualification, an emergency medical qualification, etc. The information related to the professional registration optionally includes at least one of: an identity of the professional registration, a start date of the professional registration, or a classification level of the professional registration.

The receiving identified in step 102 is by an organization. Within the context of the present Application, an organization comprises any organized group of people including, for example, a business, a company, an association, a non-profit organization, a firm, a third-party organization, or a loose affiliation of people. The organization can also be a portion of a larger organization, such as a particular group within a company, or a particular subsidiary of a company. In one embodiment, the initial information is received by a first organization from the person, and the person is applying for employment with the first organization. In one embodiment, the organization is a third-party organization which performs at least part of the method 100 and which receives the initial information from the first organization.

The method 100 then proceeds to step 104 after step 102. At step 104, the accuracy of the initial information related to the person is verified. The verifying in step 104 increases the accuracy of the scoring of the employability and employment performance characteristics of the person because it enables the scoring to be done at least partially using information that is known to be accurate. The verifying in step 104 provides other benefits as well, such as enabling the scoring of the employability and employment performance characteristics of the person to be useful in a variety of circumstances and to a variety of people and organizations without requiring inefficient duplication of effort. For example, in one embodiment, once the accuracy of the initial information has been verified, the initial information is used in a plurality of scoring processes, such as a plurality of occurrences of the method 100 or other methods described in the present Application, without being re-verified. Dispensing with the re-verification of this information is more efficient than a process in which verification of information related to the person is performed repeatedly by different organizations.

In one embodiment, the verifying in step 104 comprises communicating with at least one second person who is also related to the initial information. The second person is a different person than the person who is being scored. For example, the second person is optionally related to at least one of: the employment experience of the person being scored, the academic experience of the person being scored, or the professional registration of the person being scored. Through this contacting of the second person, the method 100 obtains verification of the initial information from a source which is different from the person being scored. Optionally, the verifying in step 104 comprises determining the relationship of the second person to the first person, which may enable the method 100 to judge the accuracy of the verifying in step 104.

One embodiment of the method 100 proceeds to step 106 after step 104. At step 106, a plurality of scores are assigned to the person. Each of the plurality of scores has a score type and a score value. The score types of the plurality of scores comprise a plurality of different score types. Generally speaking, the score type is related to some aspect of the employability and employment performance characteristics of the person. In one embodiment, the score types are related to at least one of: soft skills, logical thinking, problem solving skills, degree of technicality of work experience, degree of difficulty of work experience, completion rate for projects, average length of service in a position, innovation, employer feedback, or customer feedback. The score types may also correspond to other aspects of the employability and employment performance characteristics of the person.

One embodiment of the method 100 proceeds to step 108 after step 106. At step 108, the score value of at least one of the plurality of scores is set based on the verified initial information. In one embodiment, the score values of the plurality of scores are set based on the verified initial information. In one embodiment, at least some of the score values are set to numerical values within a predetermined range of numerical values, and the setting in step 108 comprises determining a suitable numerical score value within the predetermined range of numerical values based on the verified initial information. The numerical value optionally comprises at least one of: a numerical magnitude, or a percentage.

In one embodiment, the score value setting in step 108 comprises determining a portion of the initial information which correlates to a specific score type, and setting the score value of scores having that specific score type based on the determined correlating portion of the initial information. In one embodiment, the setting in step 108 comprises determining a plurality of different portions of the initial information which respectively correlate to a plurality of different specific score types, and setting the score value of scores having the respective plurality of different specific score types based on the determined correlating plurality of different portions of the initial information. A portion of the initial information correlates to a specific score type if it is information which provides an indicator as to the persons abilities or level of performance in the employment characteristic to which the specific score type relates. For example, a portion of the initial information correlates to a specific score type if it provides an accurate indicator of potential success or failure of the person in the employment characteristic to which the specific score type relates. In one embodiment, a correlation between a portion of the initial information and a specific score type is empirically determined using observed relationships between certain types of initial information and certain types of score types. In one embodiment, the correlation is empirically determined by observing the relationships between certain types of initial information and certain score types for a plurality of persons.

In an exemplary situation, the initial information may contain a first portion of information related to a specific type of technical work experience such as, for example, technical work experience involving a specific type of technology. In this exemplary situation, the setting in step 108 may determine that the first portion of the initial information correlates to score types related to problem solving skills, degree of technicality of work experience, degree of difficulty of work experience, completion rate for projects, and average length of service in a position; but not necessarily to score types related to soft skills, logical thinking, innovation, employer feedback, or customer feedback. Thus, in this exemplary situation, the setting in step 108 may set the score values for score types correlating to the determined first portion of the initial information, i.e., the scores having score types related to problem solving skills, degree of technicality of work experience, degree of difficulty of work experience, completion rate for projects, and average length of service in a position based on the determined first portion of the initial information.

In one embodiment, the setting in step 108 comprises setting the score value of scores based on only the correlating determined portion of the initial information, and not based on non-correlating portions of the initial information. For example, in the above-discussed exemplary situation, in one embodiment, the scores having score types related to problem solving skills, degree of technicality of work experience, degree of difficulty of work experience, completion rate for projects, and average length of service in a position are set based on the determined first portion of the initial information, and the remaining portions of the initial information are not used to set the score values of scores having those score types.

Figure 2:
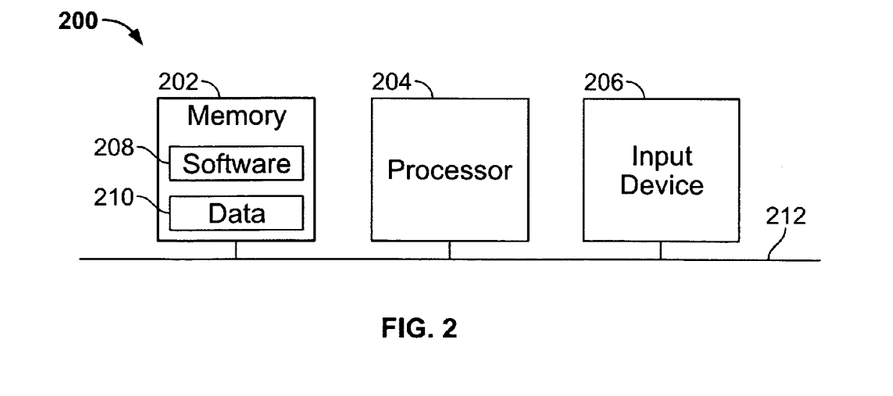
FIG. 2 depicts one embodiment of a computing environment related to the method depicted in FIG. 1.

In one embodiment, the method 100 is at least partially related to software running in a computing environment. FIG. 2 depicts an exemplary embodiment of the computing environment 200 comprising a memory 202, a processor 204, and an input device 206. The memory 202 further comprises the software 208 and data 210, which are stored in the memory 202 at least at some moment in time. The software 208 typically comprises computer program instructions which may be accessed and executed by the processor 204. The software 208 can be implemented in any suitable software language such as, for example, C, C++, etc. The memory 202 is optionally distributed across different locations. The memory 202, processor 204 and input device 206 are connected together, and communicate with each other, by means of a communication line 212. In one embodiment, the communication line 212 comprises a system bus, and the computing environment 200 comprises a single computer. In another embodiment, the communication line 212 comprises a network element, and the computing environment 200 comprises a distributed computing system. The input device 206 optionally comprises at least one of: a keyboard, a mouse, a voice activated controller, an optical controller, or an infrared controller. Other configurations of the computing environment 200 are possible.

In one embodiment, the software 208 comprises computer program instructions, which when executed by the processor 204, enable the performance of the method 100. For example, the computer program instructions of the software 208 optionally enable the automatic performance of the method 100. In one embodiment, the software 208 comprises computer program instructions, which when executed by the processor 204, and receive input from a human operator, enable the performance of the method 100. For example, the computer program instructions of the software 208 optionally provide a human operator with the ability to manage and provide input to the performance of the method 100.

Figure 3:
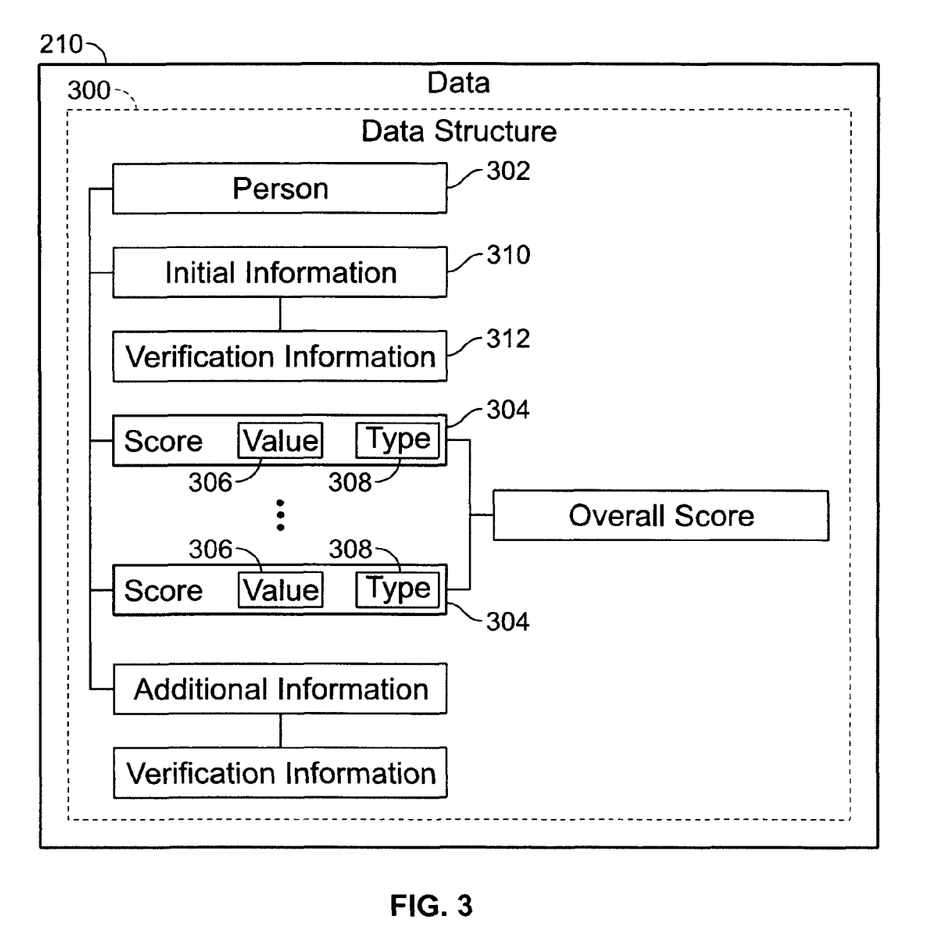
FIG. 3 depicts one embodiment of a data structure of data stored in a memory of the embodiment of the computing environment depicted in FIG. 2.

FIG. 3 depicts one embodiment of the data 210 stored in the memory 202 of the computing environment 200. The depicted embodiment of the data 210 comprises a data structure 300. In one embodiment, the data structure 300 is operable to enable the performance of the method 100. One embodiment of the data structure 300 comprises a person data element 302 and a plurality of score data elements 304. The person data element 302 identifies the person being scored. The plurality of score data elements 304 represent the plurality of scores assignee to the person. The person data element 302 optionally comprises at least one of: numerical data, textual data, or combined numerical and textual data. In one embodiment, the person data element 302 comprises at least one of: the name of the person, or the social security number of the person. Each of the plurality of score data elements 304 comprises a value data element 306 and a type data element 308, representing the score value and score type respectively. In one embodiment, the plurality of score data elements 304 are linked to the person data element 302 in the data structure 300. The data structure 300 optionally comprises at least one of: an initial information data element 310 representing at least part of the initial information related to the person, or a verification information data element 312 representing information related to the verification of the initial information. In one embodiment, the data structure 300 is part of a database, and the software 208 comprises computer program instructions to read, insert, remove, and change the data elements of the data structure 300 in the database to enable the performance of the method 100.

In addition to comprising computer program instructions which enable the performance of the method 100, the software 208 optionally comprises computer program instructions which, when executed by the processor 204, perform steps relevant to embodiments of the method 100 which are related to the computing environment 200. For example, computer program instructions which enable the performance of the receiving in step 102 optionally comprise computer program instructions which enable at least one of: transmitting the initial information by means of the input device 206 or communication line 212, or storing the received initial information as part of the data structure 300 of the data 210 stored in the memory 202. Computer program instructions which enable the performance of the verifying in step 104 optionally comprise computer program instructions which enable at least one of: transmitting information over the communication line 212 to contact the second person who is also related to the initial information, or storing information related to the verifying in step 104 as part of the data structure 300 of the data 210 stored in the memory 202. Computer program instructions which enable the performance of the assigning in step 106 optionally comprise computer program instructions which enable at least one of: transmitting the scores to be assigned using the input device 206 or the communication line 212, or linking the assigned scores with the person in the data structure 300 of the data 210 stored in the memory 202. Computer program instructions which enable the performance of the setting in step 108 optionally comprise computer program instructions which enable at least one of: transmitting the value to which the score value is to be set by the input device 206 or communication line 212 or processor 204, or storing the set score value as part of the score in the data structure 300 of the data 210 stored in the memory 202.

In one embodiment, the method 100 comprises receiving additional information related to the person, the additional information comprising at least some information not contained in the initial information, the receiving the additional information occurring after the setting in step 108. In one embodiment, the additional information comprises at least one of: an employment experience of the person not included in the initial information, an academic experience of the person not included in the initial information, or a professional registration of the person not included in the initial information. The receiving of the additional information is optionally conducted in the same manner as the receiving in step 102, including embodiments enabled by the computer program instructions of the software 208.

In one embodiment, the accuracy of the additional information is verified. The verification of the accuracy of the additional information is optionally conducted in the same manner as the verifying in step 104, including embodiments enabled by the computer program instructions of the software 208.

In one embodiment, the method 100 comprises updating the score value of at least one of the plurality of scores assigned to the person based on the verified additional information. In one embodiment, the method 100 comprises updating the score values of the plurality of scores assigned to the person based on the verified additional information. The updating of the score value enables the method to provide the plurality of scores with present values which remain valid as time passes. In one embodiment, the score value to be updated comprises a numerical value, and the updating comprises at least one of: increasing the score value, or decreasing the score value. The updating is optionally conducted in a substantially similar manner as the setting in step 108, including embodiments enabled by the computer program instructions of the software 208. For example, in a similar manner to embodiments of the setting in step 108, the updating optionally comprises determining a portion of the additional information which correlates to a specific score type, and updating the score value of scores having the correlating score type based on the determined portion of the additional information. In one embodiment, the updating comprises determining a plurality of different portions of the additional information which respectively correlate to a plurality of different specific score types, and updating the score value of scores respectively having the correlating plurality of different score types based on the determined plurality of different portions of the additional information.

In one embodiment, the data structure 300 comprises at least one of: an additional information data element 314 representing the additional information related to the person, or an additional information verification data element 316 representing information related to the verification of the additional information.

In one embodiment, at least one of the plurality of scores has a score value which is a function of time. In one embodiment, the score value as a function of time results from the updating of the score value based on the additional information. In one embodiment, the plurality of scores each have score values which are a function of time. Having a score value which is a function of time enables the method to track the score value over time. For example, an organization may be enabled to make a decision related to the person based on the score value as a function of time. For example, the organization may be able to judge whether the person has the capability of increasing certain employability and employment performance characteristics over time or if the person has reached his or her growth potential with respect to the certain employability and employment performance characteristics.

In one embodiment, the method 100 comprises assigning an overall score to the person based on the plurality of scores. The overall score may comprise a selectively weighted contribution from each of the plurality of scores. The overall score is optionally a mathematical combination of a plurality of components, the plurality of components having a one-to-one correspondence to the plurality of scores, each of the plurality of components comprising the corresponding score multiplied by a weighting factor. For example, the overall score optionally comprises a sum of the plurality of components corresponding to the weighted plurality of scores. In one embodiment, the weighting factor comprises at least one of: a percentage, a numerical magnitude, or zero. The overall score may also comprise other mathematical combinations of the plurality of scores. Weighting the contribution of each of the plurality of scores allows the overall score to be tailored for a particular purpose. For example, it may be desirable to have an overall score which provides an indication of whether the person is likely to perform well in a particular employment position. Furthermore, it may be known that certain score types provide good indicators that the person is likely to perform well in the particular employment position, and thus it may be desirable for the overall score in such a situation to heavily weight the score types which are good indicators for success in the particular position relative to score types which are not good indicators for success in the particular position.

In one embodiment, the data structure 300 comprises an overall score data element 318 representing the overall score based on the plurality of scores assigned to the person.

In one embodiment, the method 100 comprises generating a report having information related to the person. The report optionally includes at least one of: the initial information related to the person, the plurality of scores assigned to the person, or the overall score assigned to the person. In one embodiment, the report comprises at least one of: graphical information, or information as a function of time. For example, in one embodiment, the report comprises a graphical representation of at least one of: at least one of the plurality of scores assigned to the person, the plurality of scores assigned to the person, or the overall score assigned to the person. The graphical information optionally comprises a representation of the score value which is a function of time.

Figure 4A:
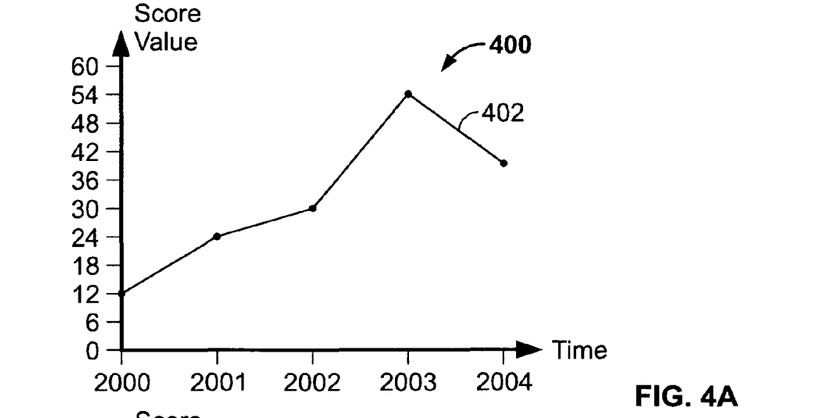
FIGS. 4a-c depict embodiments of graphical information of one embodiment of a report generated by one embodiment of the method depicted in FIG. 1.
Figure 4B:
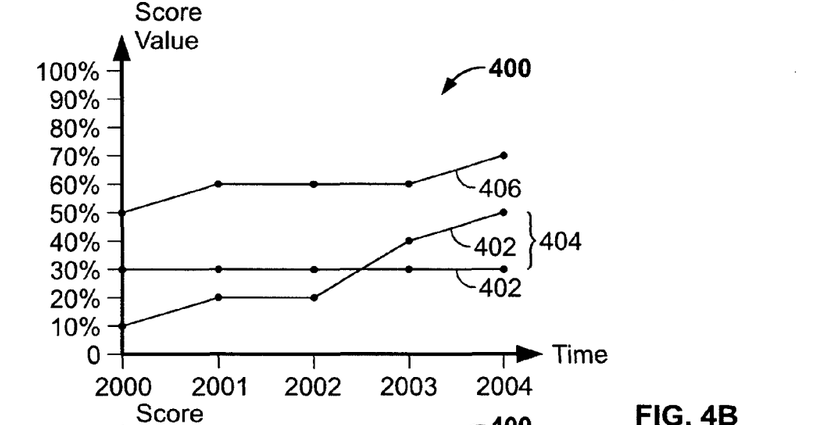
Figure 4C:
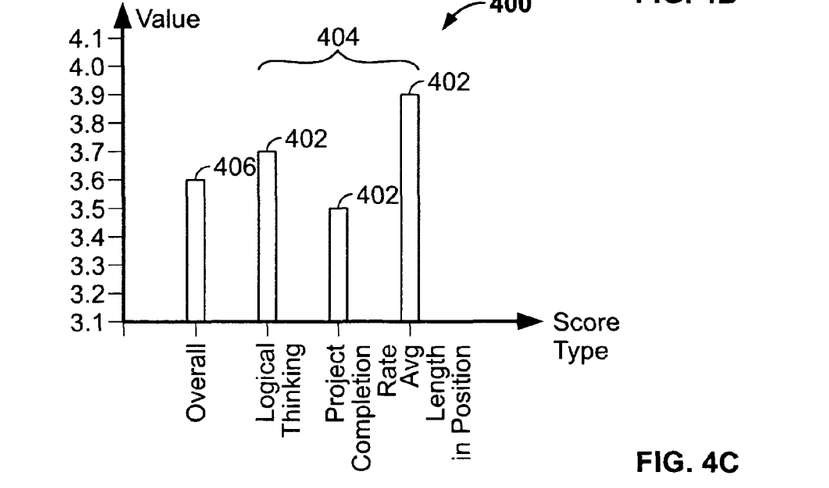

FIGS. 4a-c depict embodiments of the graphical information 400 of the report. In the embodiment depicted in FIG. 4a, the graphical information 400 comprises a graphical representation 402 of a score of the plurality of scores assigned to the person. In the embodiment depicted in FIG. 4b, the graphical information 400 comprises a graphical representation 404 of the plurality of scores assigned to the person, comprising graphical representations 402 of single scores assigned to the person, and a graphical representation 406 of the overall score based on the plurality of scores. In the embodiments depicted in FIGS. 4a-b, the graphical information 400 comprises graphical representations 402, 404, 406 of score values which are functions of time, with the y-axis representing the score value, and the x-axis representing time. In the embodiment depicted in FIG. 4c, the graphical information 400 comprises a graphical representation 404 of the plurality of scores assigned to the first person, with the y-axis representing the individual score values, and the x-axis representing the score types. In the embodiment depicted in FIG. 4c, the graphical information 400 comprises information which is not a function of time. For example, the score values represented in FIG. 4c may be the present score values, or may be a historical snapshot of score values.

In one embodiment, the method 100 comprises receiving a request for information related to the plurality of scores assigned to the person, and providing the requested information. The request is optionally from either an organization or a requesting person. The providing of the requested information is optionally in exchange for money. In one embodiment, the requested information comprises at least one of: the plurality of scores assigned to the person, or the overall score based on the plurality of scores.

Figure 5:
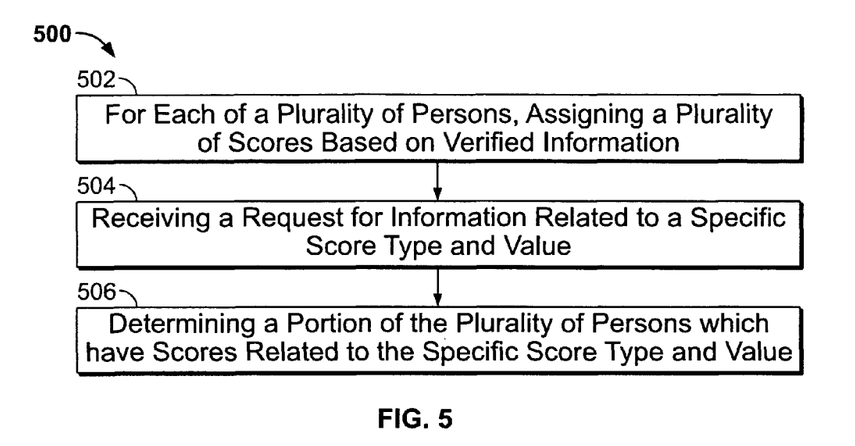
FIG. 5 is a flow chart depicting a schematic representation of one embodiment of a second method.

FIG. 5 is a flow chart depicting a schematic representation of one embodiment of a method 500. The method 500 is optionally performed independently of the method 100. The method 500 can optionally be combined with the method 100 to create a method embodiment having the individual steps of both the methods 100 and 500. Furthermore, optional steps or embodiments described with respect to the method 100 may be optionally added to the method 500 to create other method embodiments. Similarly, optional steps or embodiments described with respect to the method 500 may be optionally added to the method 100. Furthermore, the schematic nature of FIG. 5 is not intended to provide exhaustive detail concerning the method 500, and instead the specific steps of the method 500 are described in greater detail in the Specification and Claims of the present Application. Furthermore, additions to and variations of the embodiment of the method 500 depicted in FIG. 5 are possible as described in the Specification and Claims of the present Application.

One embodiment of the method 500 begins at step 502. At step 502, for each of a plurality of persons, the plurality of scores are assigned. The persons are a plurality of the persons to be scored, as discussed in regards to the person of the method 100. The plurality of scores are the plurality of scores assigned to the person as discussed in regards to the method 100. As such, each of the plurality of scores has a score type and a score value. In the method 500, the score value of at least one of the plurality of scores assigned to each specific person of the plurality of persons is based on verified information related to the specific person. Optionally, as discussed in regards to the method 100, the verified information is related to at least one of: the employment experience of the specific person, the academic experience of the specific person, or the professional registration of the specific person.

One embodiment of the method 500 proceeds to step 504 after step 502. At step 504, a request for information related to a specific score type and a specific score value is received. Generally speaking, the request is received by an organization, i.e. a requestee organization.

In one embodiment, the request is made by an organization, i.e. a requester organization. In an embodiment in which the request is received by the requestee organization from the requestor organization, the request may optionally belong to at least one of two different scenarios. In a first request scenario, the requester organization requests information related to the specific score value and the specific score type of a specific person. For example, the requestor organization may wish to determine the score value for a specific score type of the specific person who is applying for an employment position within the requestor organization. In a second request scenario, the requestor organization requests information relating to the specific score value and specific score type, but the request is not necessarily related to a specific person. For example, the requestor organization may wish to determine the identities of the portion of the plurality of persons who have a score value magnitude of at least the magnitude of the specific score value for the specific score type in order to determine a suitable pool of candidates for an employment position with the requestor organization. Other request scenarios involving the requester organization are also possible.

In one embodiment, the request is made by a person, i.e. a requestor person. In an embodiment in which the request is received by the requestee organization from the requestor person, the request may optionally belong to at least one of two different scenarios. In a third request scenario, the requestor person requests information related to the specific score value and the specific score type in relation to a specific organization. For example, the requestor person may wish to determine the specific average score value of the specific score type of people employed by the specific organization, for example in a specific employment position, in order to enable the requestor person to judge whether he or she may be a good candidate for employment with the specific organization. In a fourth request scenario, the requestor person requests information related to the specific score value and the specific score type, but the request is not necessarily related to a specific organization. For example, the requestor person may wish to determine the identities of organizations employing people who have a score value magnitude of at least the specific score value magnitude for the specific score type, for example for a specific employment position, in order to determine a suitable pool of candidate organizations to which the requestor person may apply. Other request scenarios involving the requestor person are also possible.

One embodiment of the method 500 proceeds to step 506 after step 504. At step 506, a portion of the plurality of persons to which scores have been assigned, and which have scores related to the received specific score type and specific score value, are determined. The portion is determined based upon the type of request received at step 504, for example based on the type of requestor and the specific request scenario, for example the first, second, third and fourth request scenarios. In the first request scenario, the portion of the plurality of persons determined is the specific person to whom the request is related. In the second request scenario, the portion of the plurality of persons determined is that portion which have a score value magnitude of at least the specific score value magnitude for the specific score type. In the third request scenario, the portion of the plurality of persons determined is that portion of the plurality of persons who are related to the specific organization. In the fourth request scenario, the portion of the plurality of persons determined is that portion who have the score value magnitude of at least the specific score value magnitude for the specific score type.

In one embodiment, the determining in step 506 comprises examining, for each of the plurality of persons, at least one score of the plurality of scores assigned to that person. In one embodiment, the method 500 comprises determining, for each of the plurality of persons, whether at least one of the plurality of scores assigned to that person has the score type being equal to the specific score type, and the score value corresponding to the score of the specific score type having a value magnitude equal to or greater that the specific score value magnitude.

In one embodiment, the method 500 comprises determining at least one overall score based on the plurality of scores assigned to the determined portion of the plurality of persons. For example, the determined overall score optionally comprises an average of score values, the averaged score values comprising at least one score value assigned to each the determined portion of the plurality of persons.

In one embodiment, the method 500 is at least partially related to software running in the computing environment 200. In one embodiment, the software 208 comprises computer program instructions, which when executed by the processor 204, enable the performance of the method 500. For example, the computer program instructions of the software 208 optionally enable the automatic performance of the method 500. In one embodiment, the software 208 comprises computer program instructions, which when executed by the processor 204, and receive input from a human operator, enable the performance of the method 500. For example, the computer program instructions of the software 208 optionally provide a human operator with the ability to manage and provide input to the performance of the method 500. In one embodiment, the data structure 300 is operable to enable the performance of the method 500.

In addition to comprising computer program instructions which enable the performance of the method 500, the software 208 optionally comprises computer program instructions which, when executed by the processor 204, perform steps relevant to embodiments of the method 500 which are related to the computing environment 200.

For example, computer program instructions which enable the performance of the assigning in step 502 optionally comprise computer program instructions which enable at least one of: transmitting the plurality of scores by means of the input device 206 or communication line 212 or the processor 204, or storing the plurality of scores as part of the data structure 300 of the data 210 stored in the memory 202. Computer program instructions which enable the performance of the receiving in step 504 optionally comprise computer program instructions which enable at least one of: receiving the specific score type and specific score value by means of the input device 206 or communication line 212, or storing the specific score type and specific score value as part of the data 210 stored in the memory 202. Computer program instructions which enable the performance of the determining in step 506 optionally comprise computer program instructions which enable comparing the specific score type and specific score value with the score types and score values assigned to the plurality of persons using the processor 204.

Figure 6:
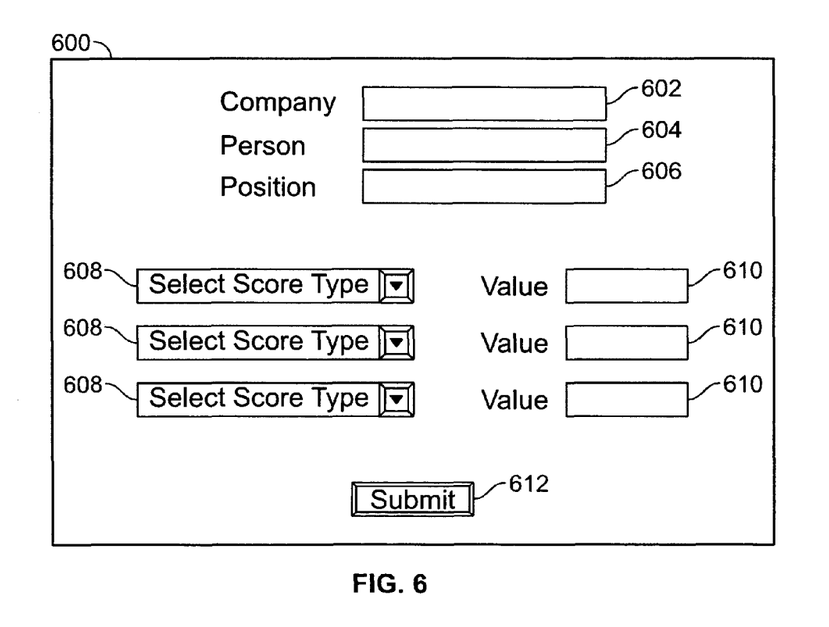
FIG. 6 depicts one embodiment of a query display generated by one embodiment of the second method depicted in FIG. 5.

In one example, FIG. 6 depicts one embodiment of a query display 600 generated by the computer program instructions of the software 208 to enable the performance of the receiving in step 504. In one embodiment, the query display 600 is generated locally for use by a human operator of the requestee organization. In one embodiment, the query display 600 is generated remotely for use by the requestor person or requestor organization. The embodiment of the query display 600 depicted in FIG. 6 is suitable for use with any of the first, second, third and fourth request scenarios of the receiving in step 504. One embodiment of the query display 600 comprises a score type data selector 608 for selection of the specific score type, and a score value data entry field 610 for entry of the specific score value. The embodiment of the query display 600 depicted in FIG. 6 comprises an organization identifier data entry field 602 for entry of an organization identifier, a person identifier data entry field 604 for entry of a person identifier, an employment position identifier data entry field 606 for entry of an employment position identifier, a plurality of the score type data selectors 608 for selection of a plurality of the specific score types, a plurality of the score value data entry fields 610 for entry of a plurality of the specific score values, and a submit actuator 612 (e.g. a submit button) to actuate the submission of the request in step 504.

Further embodiments of the present invention are also possible, which are the result of variously combining steps, elements or embodiments described herein. For example, further embodiments may comprise an altered order of the steps of the methods 100 and 500 described herein, the result of which may be an embodiment particularly suited to a specific purpose or implementation. In another example, embodiments of the methods 100 and 500 may include or exclude optional steps. Further embodiments of the present invention, which would be discernable based on the disclosure of the present Application, are also possible.

What is claimed is:

1. A method, comprising:
   maintaining a database having a plurality of scores for each of a plurality of persons associated with a plurality of organizations, the scores each having a score type and numerical score value, wherein the score values are based on verified information related to the persons, the verified information related to employment and academic experiences of the persons;
   generating a query screen on a computer display, the query screen having score type, score value, organization identifier, and employment position data entry fields;
   receiving a query request via the query screen, the query request including specific score type, employment position and organization identifier entries entered into the corresponding data entry fields;
   providing, after searching the database based on the query request, an average score value of the entered score type, the average taken over all of a plurality of the persons having the entered employment position at the entered organization; and
   updating the score value of at least one of the plurality of scores by at least one of increasing or decreasing the score value of the at least one of the plurality of scores.

2. The method of claim 1, further comprising:
   receiving additional information related to the plurality of persons, the additional information comprising at least information not contained in initial information, the receiving occurring after the setting of at least one score value based on verified initial information;
   verifying the accuracy of the additional information; and
   updating the score value of at least one of the plurality of scores based on the verified additional information.

3. The method of claim 2, further comprising:
   determining a portion of the additional information which correlates to a specific score type; and
   updating the score value of scores having the specific score type which correlates to the determined portion of the additional information.

4. The method of claim 1, wherein the score types are related to at least one of: soft skills, logical thinking, problem solving skills, degree of technicality of work experience, completion rate for projects, average length of service in a position, innovation, employer feedback, or customer feedback.

5. The method of claim 1, further comprising:
   assigning an overall score to a selected person based on the plurality of scores, wherein the overall score comprises a selectively weighted contribution from each of the plurality of scores.

6. The method of claim 1, further comprising verifying the information by communicating with at least one second person related to the information.

7. The method of claim 1, wherein at least one of the plurality of scores has a score value which is a function of time.

8. The method of claim 5, further comprising:
   generating a report related to the person, the report including a plurality of the scores assigned to the selected person, the verified information related to the selected person, and the overall score assigned to the selected person.

9. The method of claim 8, wherein the report includes graphical information and information as a function of time.

10. The method of claim 1, further comprising:
    receiving a request from an organization for information related to a plurality of scores assigned to a selected person; and
    providing the requested information to the organization in exchange for money.

11. The method of claim 1, further comprising:
    receiving a second query request via the query screen, the second query request including second specific score type, score value and employment position entries entered into the corresponding data entry fields; and
    providing, after searching the database based on the second query request, organization identifiers of each of the plurality organizations having persons in the second entered employment position having at least the second entered score value of the second entered score type.

12. The method of claim 11, wherein the query request and second query request are received from a prospective employee, and the method further comprises:
    providing the determined average score value and organization identifiers to the prospective employee.

13. A non-transitory computer-readable storage medium having stored thereon computer program instructions, which when executed by a processor perform a method, the method comprising:
    maintaining a database having a plurality of scores for each of a plurality of persons associated with a plurality of organizations, the scores each having a score type and numerical score value, wherein the score values are based on verified information related to the persons, the verified information related to employment and academic experiences of the persons;
    generating a query screen on a computer display, the query screen having score type, score value, organization identifier, and employment position data entry fields;
    receiving a query request via the query screen, the query request including specific score type, employment position and organization identifier entries entered into the corresponding data entry fields;
    providing, after searching the database based on the query request, an average score value of the entered score type, the average taken over all of a plurality of the persons having the entered employment position at the entered organization; and
    updating the score value of at least one of the plurality of scores by at least one of increasing or decreasing the score value of the at least one of the plurality of scores.

14. The non-transitory computer readable storage medium of claim 13, the method further comprising:
    receiving additional information related to the plurality of persons, the additional information comprising at least information not contained in initial information, the receiving occurring after the setting of at least one score value based on verified initial information;
    verifying the accuracy of the additional information; and
    updating the score value of at least one of the plurality of scores based on the verified additional information.

15. The non-transitory computer readable storage medium of claim 14, the method further comprising:

determining a portion of the additional information which correlates to a specific score type; and updating the score value of scores having the specific score type which correlates to the determined portion of the additional information.

16. The non-transitory computer readable storage medium of claim 13, the method further comprising:

assigning an overall score to a selected person based on the plurality of scores, wherein the overall score comprises a selectively weighted contribution from each of the plurality of scores.

17. The non-transitory computer readable storage medium of claim 13, wherein the query request and second query request are received from a prospective employee, and the method further comprises:

providing the determined average score value and organization identifiers to the prospective employee.

18. The non-transitory computer-readable storage medium of claim 13, wherein the method further comprises:

receiving a second query request via the query screen, the second query request including second specific score type, score value and employment position entries entered into the corresponding data entry fields; and providing, after searching the database based on the second query request, organization identifiers of each of the plurality organizations having persons in the second entered employment position having at least the second entered score value of the second entered score type.

* * * * *